United States Patent
Zhang et al.

(10) Patent No.: US 10,034,215 B2
(45) Date of Patent: Jul. 24, 2018

(54) OFFLOADING METHOD, USER EQUIPMENT, BASE STATION, AND ACCESS POINT

(71) Applicant: Huawei Technologies Co., Ltd., Shenzhen (CN)

(72) Inventors: Hongping Zhang, Shanghai (CN); Qinghai Zeng, Shanghai (CN); Jian Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 15/194,166

(22) Filed: Jun. 27, 2016

(65) Prior Publication Data

US 2016/0309384 A1 Oct. 20, 2016

Related U.S. Application Data

(63) Continuation of application No. PCT/CN2013/090710, filed on Dec. 27, 2013.

(51) Int. Cl.
*H04W 36/00* (2009.01)
*H04W 36/22* (2009.01)
(Continued)

(52) U.S. Cl.
CPC ........... *H04W 36/22* (2013.01); *H04W 12/06* (2013.01); *H04W 12/10* (2013.01);
(Continued)

(58) Field of Classification Search
CPC ..... H04W 36/22; H04W 12/06; H04W 12/10; H04W 36/0077; H04W 92/02; H04W 88/06; H04W 36/14
(Continued)

(56) References Cited

U.S. PATENT DOCUMENTS

2013/0088983 A1 4/2013 Pragada et al.
2013/0166910 A1* 6/2013 Wilkinson ............ H04W 12/04
713/168
(Continued)

FOREIGN PATENT DOCUMENTS

CN 102572973 A 7/2012
CN 102685741 A 9/2012
(Continued)

OTHER PUBLICATIONS

Benton, "The Evolution of 802.11 Wireless Security," UNLV Informatics-Spring 2010, pp. 1-56 (Apr. 18, 2010).

*Primary Examiner* — Marcos Batista
(74) *Attorney, Agent, or Firm* — Leydig, Voit & Mayer, Ltd.

(57) ABSTRACT

The present invention discloses an offloading method, which includes: receiving, by user equipment, an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point; and performing, by the user equipment, the bidirectional authentication with the access point according to the security parameter sent by the base station to the user equipment, so that the user equipment accesses the access point according to the access method and performs offloading to the wireless local area network.

9 Claims, 5 Drawing Sheets

(51) Int. Cl.
*H04W 12/06* (2009.01)
*H04W 12/10* (2009.01)
*H04W 36/14* (2009.01)
*H04W 88/06* (2009.01)
*H04L 29/06* (2006.01)

(52) U.S. Cl.
CPC ....... *H04W 36/0077* (2013.01); *H04L 63/123* (2013.01); *H04W 36/14* (2013.01); *H04W 88/06* (2013.01)

(58) Field of Classification Search
USPC .......................................... 455/436; 370/338
See application file for complete search history.

(56) References Cited

U.S. PATENT DOCUMENTS

2014/0136844 A1  5/2014  Ding et al.
2014/0334446 A1* 11/2014  Lim ..................... H04W 28/08
                                                           370/331

FOREIGN PATENT DOCUMENTS

| | | |
|---|---|---|
| CN | 102883316 A | 1/2013 |
| EP | 2854329 A1 | 4/2015 |
| GB | 2495550 A | 4/2013 |
| WO | 2013174267 A1 | 11/2013 |

* cited by examiner

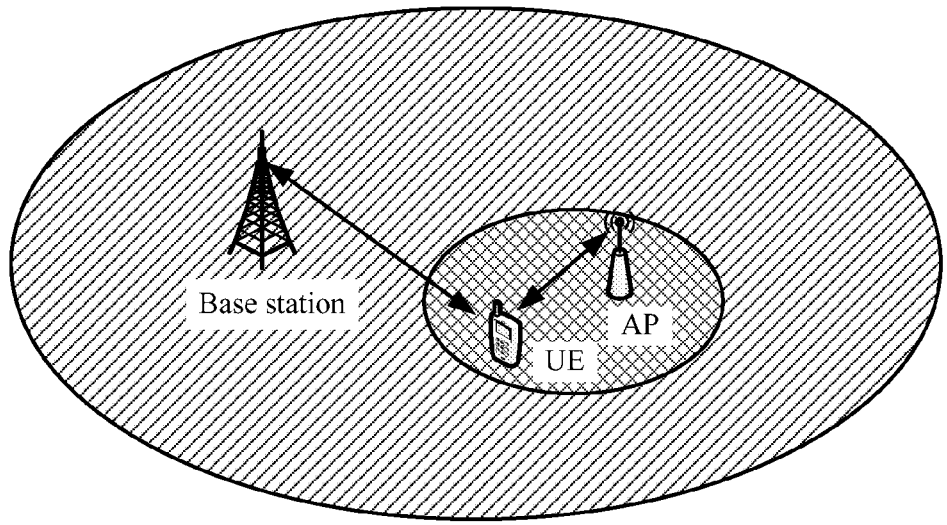

| User equipment receives an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point | S210 |

| The user equipment performs the bidirectional authentication with the access point according to the security parameter sent by the base station to the user equipment, so that the user equipment accesses the access point according to the access method and performs offloading to the wireless local area network | S220 |

| An access point receives a security parameter sent by a base station, where the security parameter is used by the access point and user equipment to perform bidirectional authentication, the base station belongs to a wireless cellular network, the access point belongs to a wireless local area network, the security parameter is further carried in an offloading indication sent by the base station to the user equipment, and the offloading indication is used to indicate an access method for the user equipment to access the access point | S510 |

| The access point performs the bidirectional authentication with the user equipment according to the security parameter sent by the base station to the access point, so that the user equipment accesses the access point according to the access method and performs offloading to the wireless local area network | S520 |

FIG. 5

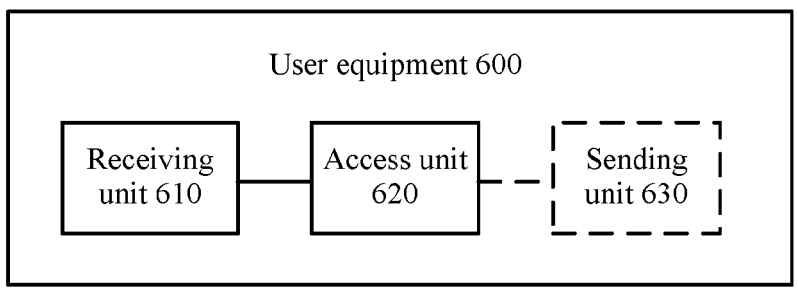

FIG. 6

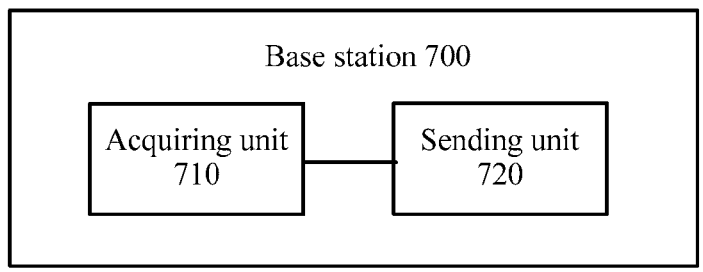

FIG. 7

OFFLOADING METHOD, USER EQUIPMENT, BASE STATION, AND ACCESS POINT

CROSS-REFERENCE TO RELATED APPLICATIONS

This application is a continuation of International Application No. PCT/CN2013/090710, filed on Dec. 27, 2013, which is hereby incorporated by reference in its entirety.

TECHNICAL FIELD

The present invention relates to the communications field, and more specifically, to an offloading method, user equipment, a base station, and an access point.

BACKGROUND

As a mobile Internet service is increasingly diversified, an amount of data in a wireless mobile communications network surges, but network utilization of a wireless local area network (WLAN), which generally refers to Wireless Fidelity (Wireless Fidelity, WiFi), deployed by a telecommunications operator is low. To relieve network congestion, the current industry is considering using a data offloading manner to offload some or all of the data in the wireless mobile communications network to the WLAN network. A specific offloading manner is as follows: Some or all of services of user equipment (User equipment, UE) are transmitted by using the WLAN.

After the UE or a 3rd Generation Partnership Project (3rd Generation Partnership Project, 3GPP) network determines, according to a factor such as load, to offload some or all of the services of the UE to the WLAN, the UE needs to first access an access point (Access Point, AP) corresponding to the WLAN. A delay in a traditional WLAN access method is relatively long, resulting in communication interruption of the UE.

SUMMARY

Embodiments of the present invention provide an offloading method, user equipment, a base station, and an access point, which can ensure that user equipment performs rapid offloading to a wireless local area network, and reduce an access delay.

According to a first aspect, an offloading method is provided, including:

receiving, by user equipment, an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point; and performing, by the user equipment, the bidirectional authentication with the access point according to the security parameter sent by the base station to the user equipment, so that the user equipment accesses the access point according to the access method and performs offloading to the wireless local area network.

With reference to the first aspect, in a first possible implementation manner, when the security parameter includes a pairwise transient key, the performing, by the user equipment, the bidirectional authentication with the access point according to the security parameter sent by the base station to the user equipment includes:

sending, by the user equipment, a first message integrity code generated by using the pairwise transient key in the offloading indication to the access point, so that the access point determines, according to the first message integrity code and a second message integrity code, whether authentication on the user equipment succeeds, where the second message integrity code is generated by the access point according to the pairwise transient key acquired by the base station;

when the access point determines that the authentication on the user equipment succeeds, receiving, by the user equipment, a third message integrity code sent by the access point, where the third message integrity code is generated by the access point according to the pairwise transient key acquired by the base station;

determining, by the user equipment according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, completing, by the user equipment, the bidirectional authentication with the access point.

With reference to the first aspect, in a second possible implementation manner, when the security parameter includes a pairwise master key, the performing, by the user equipment, the bidirectional authentication with the access point according to the security parameter sent by the base station to the user equipment includes:

acquiring, by the user equipment, a first pairwise transient key according to the pairwise master key in the offloading indication;

sending, by the user equipment, a first message integrity code generated by using the first pairwise transient key to the access point, so that the access point determines, according to the first message integrity code and a second message integrity code, whether authentication on the user equipment succeeds, where the second message integrity code is generated by the access point according to a second pairwise transient key, and the second pairwise transient key is generated by the access point according to the pairwise master key acquired by the base station;

when the access point determines that the authentication on the user equipment succeeds, receiving, by the user equipment, a third message integrity code sent by the access point, where the third message integrity code is generated by the access point according to the second pairwise transient key;

determining, by the user equipment according to the third message integrity code and a fourth message integrity code, whether authentication on the access point succeeds, where the fourth message integrity code is generated by the user equipment according to the first pairwise transient key; and when the user equipment determines that the authentication on the access point succeeds, completing, by the user equipment, the bidirectional authentication with the access point.

With reference to the first or the second possible implementation manner of the first aspect, in a third possible implementation manner, the offloading method further includes:

sending, by the user equipment, a re-association request to the access point, so that the access point generates the second message integrity code according to the re-association request and the security parameter acquired from the base station;

generating, by the user equipment, the first message integrity code according to the security parameter in the offloading indication and the re-association request;

receiving, by the user equipment, a re-association response sent by the access point; and generating, by the user equipment, the fourth message integrity code according to the re-association response and the security parameter in the offloading indication.

With reference to the second possible implementation manner of the first aspect, in a fourth possible implementation manner, the method further includes:

sending, by the user equipment, an authentication request to the access point, where the authentication request includes a supplicant nonce;

receiving, by the user equipment, an authentication response sent by the access point, where the authentication response includes an authenticator nonce; and the acquiring, by the user equipment, a first pairwise transient key according to the pairwise master key in the offloading indication includes:

acquiring, by the user equipment, the first pairwise transient key according to the pairwise master key in the offloading indication, the authenticator nonce, and the supplicant nonce.

With reference to the first aspect or any possible implementation manner of the first to the fourth possible implementation manners of the first aspect, in a fifth possible implementation manner, the security parameter is determined after the base station negotiates with the access point, or is determined by the base station itself.

According to a second aspect, an offloading method is provided, including:

acquiring, by a base station, a security parameter used by user equipment and an access point to perform bidirectional authentication, where the base station belongs to a wireless cellular network, and the access point belongs to a wireless local area network;

sending, by the base station, the security parameter to the access point, where the security parameter is used by the access point and the user equipment to perform the bidirectional authentication; and sending, by the base station, an offloading indication to the user equipment, where the offloading indication is used to indicate an access method for the user equipment to access the access point, and the offloading indication includes the security parameter, so that the user equipment performs the bidirectional authentication with the access point according to the received security parameter, and the user equipment accesses the access point according to the access method and performs offloading to the wireless local area network.

With reference to the second aspect, in a first possible implementation manner, the security parameter includes a pairwise transient key, where the pairwise transient key is used by the user equipment and the access point to perform the bidirectional authentication.

With reference to the second aspect, in a second possible implementation manner, the security parameter includes a pairwise master key, where the pairwise master key is used by the user equipment and the access point to determine a pairwise transient key, and the pairwise transient key is used by the user equipment and the access point to perform the bidirectional authentication.

With reference to the second aspect or the first or the second possible implementation manner of the second aspect, in a third possible implementation manner, the acquiring, by a base station, a security parameter used by user equipment and an access point to perform bidirectional authentication includes:

determining, by the base station after negotiating with the access point, the security parameter used by the user equipment and the access point to perform the bidirectional authentication; or determining, by the base station itself, the security parameter used by the user equipment and the access point to perform the bidirectional authentication.

According to a third aspect, an offloading method is provided, including:

receiving, by an access point, a security parameter sent by a base station, where the security parameter is used by the access point and user equipment to perform bidirectional authentication, the base station belongs to a wireless cellular network, the access point belongs to a wireless local area network, the security parameter is further carried in an offloading indication sent by the base station to the user equipment, and the offloading indication is used to indicate an access method for the user equipment to access the access point; and performing, by the access point, the bidirectional authentication with the user equipment according to the security parameter sent by the base station to the access point, so that the user equipment accesses the access point according to the access method and performs offloading to the wireless local area network.

With reference to the third aspect, in a first possible implementation manner, when the security parameter includes a pairwise transient key, the performing, by the access point, the bidirectional authentication with the user equipment according to the security parameter sent by the base station to the access point includes:

receiving, by the access point, a first message integrity code that is sent by the user equipment and is generated by using the pairwise transient key in the offloading indication;

determining, by the access point according to the first message integrity code and a second message integrity code, whether authentication on the user equipment succeeds, where the second message integrity code is generated by the access point according to the acquired pairwise transient key; and when determining that the authentication on the user equipment succeeds, sending, by the access point, a third message integrity code generated by using the acquired pairwise transient key to the user equipment, so that the user equipment determines, according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, completing, by the access point, the bidirectional authentication with the user equipment.

With reference to the third aspect, in a second possible implementation manner, when the security parameter includes a pairwise master key, the performing, by the access point, the bidirectional authentication with the user equipment according to the security parameter sent by the base station to the access point includes:

receiving, by the access point, a first message integrity code that is sent by the user equipment and is generated by using a first pairwise transient key, where the first pairwise transient key is generated by the user equipment according to the pairwise master key in the offloading indication;

acquiring, by the access point, a second pairwise transient key according to the pairwise master key sent by the base station;

determining, by the access point according to the first message integrity code and a second message integrity code, whether authentication on the user equipment succeeds, where the second message integrity code is generated by the access point according to the second pairwise transient key; and when determining that the authentication on the user equipment succeeds, sending, by the access point, a third message integrity code generated by using the second pairwise transient key to the user equipment, so that the user equipment determines, according to the third message integrity code and a fourth message integrity code, whether authentication on the access point succeeds, where the fourth message integrity code is generated by the user equipment according to the first pairwise transient key; and when the user equipment determines that the authentication on the access point succeeds, completing, by the access point, the bidirectional authentication with the user equipment.

With reference to the first or the second possible implementation manner of the third aspect, in a third possible implementation manner, the offloading method further includes:

receiving, by the access point, a re-association request sent by the user equipment, where the re-association request includes the first message integrity code generated by the user equipment by using the security parameter in the offloading indication and the re-association request;

generating, by the access point, the second message integrity code according to the re-association request and the security parameter sent by the base station; and sending, by the access point, a re-association response to the user equipment, where the re-association response includes the third message integrity code generated by the access point according to the acquired security parameter and the re-association response, so that the user equipment generates the fourth message integrity code according to the re-association response and the security parameter in the offloading indication.

With reference to the second possible implementation manner of the third aspect, in a fourth possible implementation manner, the method further includes:

receiving, by the access point, an authentication request sent by the user equipment, where the authentication request includes a supplicant nonce;

sending, by the access point, an authentication response to the user equipment, where the authentication response includes an authenticator nonce; and the acquiring, by the access point, a second pairwise transient key according to the pairwise master key sent by the base station includes:

acquiring, by the access point, the second pairwise transient key according to the pairwise master key sent by the base station, the authenticator nonce, and the supplicant nonce.

With reference to the third aspect or any possible implementation manner of the first to the fourth possible implementation manners of the third aspect, in a fifth possible implementation manner, the security parameter is determined after the base station negotiates with the access point, or is determined by the base station itself.

According to a fourth aspect, user equipment is provided, including:

a receiving unit, configured to receive an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point; and an access unit, configured to perform the bidirectional authentication with the access point according to the security parameter received by the receiving unit, so that the user equipment accesses the access point according to the access method and performs offloading to the wireless local area network.

With reference to the fourth aspect, in a first possible implementation manner, in a case in which the security parameter includes a pairwise transient key, the user equipment further includes a sending unit, configured to send a first message integrity code generated by using the pairwise transient key in the offloading indication to the access point, so that the access point determines, according to the first message integrity code and a second message integrity code, whether authentication on the user equipment succeeds, where the second message integrity code is generated by the access point according to the pairwise transient key acquired by the base station;

when the access point determines that the authentication on the user equipment succeeds, the receiving unit is further configured to receive a third message integrity code sent by the access point, where the third message integrity code is generated by the access point according to the pairwise transient key acquired by the base station; and the access unit is specifically configured to:

determine, according to the third message integrity code and a fourth message integrity code, whether authentication on the access point succeeds, where the fourth message integrity code is generated by using the pairwise transient key in the offloading indication; and when determining that the authentication on the access point succeeds, complete the bidirectional authentication with the access point.

With reference to the fourth aspect, in a second possible implementation manner, in a case in which the security parameter includes a pairwise master key, the user equipment further includes a sending unit, configured to send a first message integrity code generated by using a first pairwise transient key to the access point, so that the access point determines, according to the first message integrity code and a second message integrity code, whether authentication on the user equipment succeeds, where the first pairwise transient key is acquired according to the pairwise master key in the offloading indication, the second message integrity code is generated by the access point according to a second pairwise transient key, and the second pairwise transient key is generated by the access point according to the pairwise master key acquired by the base station;

when the access point determines that the authentication on the user equipment succeeds, the receiving unit is further configured to receive a third message integrity code sent by the access point, where the third message integrity code is generated by the access point according to the second pairwise transient key; and the access unit is specifically configured to:

determine, according to the third message integrity code and a fourth message integrity code, whether authentication on the access point succeeds, where the fourth message integrity code is generated by using the first pairwise transient key; and when determining that the authentication on the access point succeeds, complete the bidirectional authentication with the access point.

With reference to the first or the second possible implementation manner of the fourth aspect, in a third possible implementation manner, the sending unit is further configured to send a re-association request to the access point, so that the access point generates the second message integrity code according to the re-association request and the security parameter acquired from the base station;

the access unit is further configured to generate the first message integrity code according to the security parameter in the offloading indication and the re-association request;

the receiving unit is further configured to receive a re-association response sent by the access point; and the access unit is further configured to generate the fourth message integrity code according to the re-association response and the security parameter in the offloading indication.

With reference to the second possible implementation manner of the fourth aspect, in a fourth possible implementation manner, the sending unit is further configured to send an authentication request to the access point, where the authentication request includes a supplicant nonce;

the receiving unit is further configured to receive an authentication response sent by the access point, where the authentication response includes an authenticator nonce; and the access unit is further configured to acquire the first pairwise transient key according to the pairwise master key in the offloading indication, the authenticator nonce, and the supplicant nonce.

With reference to the fourth aspect or any possible implementation manner of the first to the fourth possible implementation manners of the fourth aspect, in a fifth possible implementation manner, the security parameter is determined after the base station negotiates with the access point, or is determined by the base station itself.

According to a fifth aspect, a base station is provided, including:

an acquiring unit, configured to acquire a security parameter used by user equipment and an access point to perform bidirectional authentication, where the base station belongs to a wireless cellular network, and the access point belongs to a wireless local area network; and a sending unit, configured to: send the security parameter to the access point, where the security parameter is used by the access point and the user equipment to perform the bidirectional authentication; and send an offloading indication to the user equipment, where the offloading indication is used to indicate an access method for the user equipment to access the access point, and the offloading indication includes the security parameter, so that the user equipment performs the bidirectional authentication with the access point according to the received security parameter, and the user equipment accesses the access point according to the access method and performs offloading to the wireless local area network.

With reference to the fifth aspect, in a first possible implementation manner, the security parameter includes a pairwise transient key, where the pairwise transient key is used by the user equipment and the access point to perform the bidirectional authentication.

With reference to the fifth aspect, in a second possible implementation manner, the security parameter includes a pairwise master key, where the pairwise master key is used by the user equipment and the access point to determine a pairwise transient key, and the pairwise transient key is used by the user equipment and the access point to perform the bidirectional authentication.

With reference to the fifth aspect or the first or the second possible implementation manner of the fifth aspect, in a third possible implementation manner, the acquiring unit is specifically configured to:

determine, after negotiating with the access point, the security parameter used by the user equipment and the access point to perform the bidirectional authentication; or determine, by itself, the security parameter used by the user equipment and the access point to perform the bidirectional authentication.

According to a sixth aspect, an access point is provided, including:

a receiving unit, configured to receive a security parameter sent by a base station, where the security parameter is used by the access point and user equipment to perform bidirectional authentication, the base station belongs to a wireless cellular network, the access point belongs to a wireless local area network, the security parameter is further carried in an offloading indication sent by the base station to the user equipment, and the offloading indication is used to indicate an access method for the user equipment to access the access point; and an access unit, configured to perform the bidirectional authentication with the user equipment according to the security parameter received by the receiving unit, so that the user equipment accesses the access point according to the access method and performs offloading to the wireless local area network.

With reference to the sixth aspect, in a first possible implementation manner, in a case in which the security parameter includes a pairwise transient key, the receiving unit is further configured to receive a first message integrity code that is sent by the user equipment and is generated by using the pairwise transient key in the offloading indication;

the access unit is specifically configured to determine, according to the first message integrity code and a second message integrity code, whether authentication on the user equipment succeeds, where the second message integrity code is generated by the receiving unit according to the acquired pairwise transient key; and the access point further includes a sending unit, configured to: when the access unit determines that the authentication on the user equipment succeeds, send a third message integrity code generated by using the pairwise transient key acquired by the receiving unit to the user equipment, so that the user equipment determines, according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, complete the bidirectional authentication with the user equipment.

With reference to the sixth aspect, in a second possible implementation manner, in a case in which the security parameter includes a pairwise master key, the receiving unit is further configured to receive a first message integrity code that is sent by the user equipment and is generated by using a first pairwise transient key, where the first pairwise transient key is generated by the user equipment according to the pairwise master key in the offloading indication;

the access unit is specifically configured to:

determine, according to the first message integrity code and a second message integrity code, whether authentication on the user equipment succeeds, where the second message integrity code is generated by using a second pairwise transient key, and the second pairwise transient key is generated by using the pairwise master key received by the receiving unit; and the access point further includes a sending unit, configured to: when the access unit determines that the authentication on the user equipment succeeds, send a third message integrity code generated by using the second pairwise transient key to the user equipment, so that the user equipment determines, according to the third message integrity code and a fourth message integrity code, whether authentication on the access point succeeds, where the fourth message integrity code is generated by the user equipment according to the first pairwise transient key; and when the user equipment determines that the authentication on the access point succeeds, complete the bidirectional authentication with the user equipment.

With reference to the first or the second possible implementation manner of the sixth aspect, in a third possible implementation manner, the receiving unit is further configured to receive a re-association request sent by the user equipment, where the re-association request includes the first message integrity code generated by the user equipment by using the security parameter in the offloading indication and the re-association request;

the access unit is further configured to:

generate the second message integrity code according to the re-association request and the security parameter received by the receiving unit; and generate the third message integrity code according to the security parameter received by the receiving unit and a re-association response, where the re-association response is sent by the sending unit to the user equipment; and the sending unit is further configured to send the re-association response to the user equipment, where the re-association response includes the third message integrity code, so that the user equipment generates the fourth message integrity code according to the re-association response and the security parameter in the offloading indication.

With reference to the second possible implementation manner of the sixth aspect, in a fourth possible implementation manner, the receiving unit is further configured to receive an authentication request sent by the user equipment, where the authentication request includes a supplicant nonce;

the sending unit is further configured to send an authentication response to the user equipment, where the authentication response includes an authenticator nonce; and the access unit is further configured to acquire the second pairwise transient key according to the pairwise master key received by the receiving unit, the authenticator nonce, and the supplicant nonce.

With reference to the sixth aspect or any possible implementation manner of the first to the fourth possible implementation manners of the sixth aspect, in a fifth possible implementation manner, the security parameter is determined after the base station negotiates with the access point, or is determined by the base station itself.

According to a seventh aspect, user equipment is provided, including a processor, a memory, and a network interface, where the memory is configured to store a program; and the processor executes the program to execute the following operations:

receiving, by using the network interface, an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point; and performing the bidirectional authentication with the access point according to the security parameter sent by the base station to the user equipment, so that the user equipment accesses the access point according to the access method and performs offloading to the wireless local area network.

With reference to the seventh aspect, in a first possible implementation manner, in a case in which the security parameter includes a pairwise transient key, the processor is specifically configured to:

send, by using the network interface, a first message integrity code generated by using the pairwise transient key in the offloading indication to the access point, so that the access point determines, according to the first message integrity code and a second message integrity code, whether authentication on the user equipment succeeds, where the second message integrity code is generated by the access point according to the pairwise transient key acquired by the base station;

receive, by using the network interface, a third message integrity code sent by the access point when the access point determines that the authentication on the user equipment succeeds, where the third message integrity code is generated by the access point according to the pairwise transient key acquired by the base station;

determine, according to the third message integrity code and a fourth message integrity code, whether authentication on the access point succeeds, where the fourth message integrity code is generated according to the pairwise transient key in the offloading indication; and when determining that the authentication on the access point succeeds, complete the bidirectional authentication with the access point.

With reference to the seventh aspect, in a second possible implementation manner, in a case in which the security parameter includes a pairwise master key, the processor is specifically configured to:

send, by using the network interface, a first message integrity code generated by using a first pairwise transient key to the access point, so that the access point determines, according to the first message integrity code and a second message integrity code, whether authentication on the user equipment succeeds, where the first pairwise transient key is acquired by using the pairwise master key in the offloading indication, the second message integrity code is generated by the access point according to a second pairwise transient key, and the second pairwise transient key is generated by the access point according to the pairwise master key acquired by the base station;

receive, by using the network interface, a third message integrity code sent by the access point when the access point determines that the authentication on the user equipment succeeds, where the third message integrity code is generated by the access point according to the second pairwise transient key;

determine, according to the third message integrity code and a fourth message integrity code, whether authentication on the access point succeeds, where the fourth message integrity code is generated according to the first pairwise transient key; and when determining that the authentication on the access point succeeds, complete the bidirectional authentication with the access point.

With reference to the first or the second possible implementation manner of the seventh aspect, in a third possible implementation manner, the processor is further configured to:

send a re-association request to the access point by using the network interface, so that the access point generates the second message integrity code according to the re-association request and the security parameter acquired from the base station;

generate the first message integrity code according to the security parameter in the offloading indication and the re-association request;

receive, by using the network interface, a re-association response sent by the access point; and generate the fourth message integrity code according to the re-association response and the security parameter in the offloading indication.

With reference to the second possible implementation manner of the seventh aspect, in a fourth possible implementation manner, the processor is further configured to:

send an authentication request to the access point by using the network interface, where the authentication request includes a supplicant nonce;

receive, by using the network interface, an authentication response sent by the access point, where the authentication response includes an authenticator nonce; and acquire the first pairwise transient key according to the pairwise master key in the offloading indication, the authenticator nonce, and the supplicant nonce.

With reference to the seventh aspect or any possible implementation manner of the first to the fourth possible implementation manners of the seventh aspect, in a fifth possible implementation manner, the security parameter is determined after the base station negotiates with the access point, or is determined by the base station itself.

According to an eighth aspect, a base station is provided, including a processor, a memory, and a network interface, where the memory is configured to store a program; and the processor executes the program to execute the following operations:

acquiring a security parameter used by user equipment and an access point to perform bidirectional authentication, where the base station belongs to a wireless cellular network, and the access point belongs to a wireless local area network; and sending the security parameter to the access point by using the network interface, where the security parameter is used by the access point and the user equipment to perform the bidirectional authentication; and sending an offloading indication to the user equipment, where the offloading indication is used to indicate an access method for the user equipment to access the access point, and the offloading indication includes the security parameter, so that the user equipment performs the bidirectional authentication with the access point according to the received security parameter, and the user equipment accesses the access point according to the access method and performs offloading to the wireless local area network.

With reference to the eighth aspect, in a first possible implementation manner, the security parameter includes a pairwise transient key, where the pairwise transient key is used by the user equipment and the access point to perform the bidirectional authentication.

With reference to the eighth aspect, in a second possible implementation manner, the security parameter includes a pairwise master key, where the pairwise master key is used by the user equipment and the access point to determine a pairwise transient key, and the pairwise transient key is used by the user equipment and the access point to perform the bidirectional authentication.

With reference to the eighth aspect or the first or the second possible implementation manner of the eighth aspect, in a third possible implementation manner, the processor is further configured to: determine, after negotiating with the access point, the security parameter used by the user equipment and the access point to perform the bidirectional authentication; or determine, by itself, the security parameter used by the user equipment and the access point to perform the bidirectional authentication.

According to a ninth aspect, an access point is provided, including a processor, a memory, and a network interface, where the memory is configured to store a program; and the processor executes the program to execute the following operations:

receiving, by using the network interface, a security parameter sent by a base station, where the security parameter is used by the access point and user equipment to perform bidirectional authentication, the base station belongs to a wireless cellular network, the access point belongs to a wireless local area network, the security parameter is further carried in an offloading indication sent by the base station to the user equipment, and the offloading indication is used to indicate an access method for the user equipment to access the access point; and performing, the bidirectional authentication with the user equipment according to the security parameter sent by the base station to the access point, so that the user equipment accesses the access point according to the access method and performs offloading to the wireless local area network.

With reference to the ninth aspect, in a first possible implementation manner, in a case in which the security parameter includes a pairwise transient key, the processor is specifically configured to:

receive, by using the network interface, a first message integrity code that is sent by the user equipment and is generated by using the pairwise transient key in the offloading indication;

determine, according to the first message integrity code and a second message integrity code, whether authentication on the user equipment succeeds, where the second message integrity code is generated according to the acquired pairwise transient key; and when determining that the authentication on the user equipment succeeds, send, by using the network interface, a third message integrity code generated by using the acquired pairwise transient key to the user equipment, so that the user equipment determines, according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, complete the bidirectional authentication with the user equipment.

With reference to the ninth aspect, in a second possible implementation manner, in a case in which the security parameter includes a pairwise master key, the processor is specifically configured to:

receive, by using the network interface, a first message integrity code that is sent by the user equipment and is generated by using a first pairwise transient key, where the first pairwise transient key is generated by the user equipment according to the pairwise master key in the offloading indication;

determine, according to the first message integrity code and a second message integrity code, whether authentication on the user equipment succeeds, where the second message integrity code is generated according to the second pairwise transient key, and the second pairwise transient key is acquired by using the pairwise master key sent by the base station; and when determining that the authentication on the user equipment succeeds, send, by using the network interface, a third message integrity code generated by using the second pairwise transient key to the user equipment, so that the user equipment determines, according to the third message integrity code and a fourth message integrity code, whether authentication on the access point succeeds, where the fourth message integrity code is generated by the user equipment according to the first pairwise transient key; and when the user equipment determines that the authentication on the access point succeeds, complete the bidirectional authentication with the user equipment.

With reference to the first or the second possible implementation manner of the ninth aspect, in a third possible implementation manner, the processor is further configured to:

receive, by using the network interface, a re-association request sent by the user equipment, where the re-association request includes the first message integrity code generated by the user equipment by using the security parameter in the offloading indication and the re-association request;

generate the second message integrity code according to the re-association request and the security parameter sent by the base station; and send a re-association response to the user equipment by using the network interface, where the re-association response includes the third message integrity code generated according to the acquired security parameter and the re-association response, so that the user equipment generates the fourth message integrity code according to the re-association response and the security parameter in the offloading indication.

With reference to the second possible implementation manner of the ninth aspect, in a fourth possible implementation manner, the processor is further configured to:

receive, by using the network interface, an authentication request sent by the user equipment, where the authentication request includes a supplicant nonce;

send an authentication response to the user equipment by using the network interface, where the authentication response includes an authenticator nonce; and acquire the second pairwise transient key according to the pairwise master key sent by the base station, the authenticator nonce, and the supplicant nonce.

With reference to the ninth aspect or any possible implementation manner of the first to the fourth possible implementation manners of the ninth aspect, in a fifth possible implementation manner, the security parameter is determined after the base station negotiates with the access point, or is determined by the base station itself.

Based on the foregoing technical solutions, in the embodiments of the present invention, an AP is accessed according to an access method indicated by a base station in an offloading indication and a security parameter included in the offloading indication, so that rapid offloading to a WLAN can be performed, an access delay is reduced, and user experience can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a diagram of an application scenario according to an embodiment of the present invention;

FIG. 2 is a schematic flowchart of an offloading method according to an embodiment of the present invention;

FIG. 5 is a schematic flowchart of an offloading method according to still another embodiment of the present invention;

FIG. 6 is a schematic block diagram of user equipment according to an embodiment of the present invention;

FIG. 7 is a schematic block diagram of a base station according to an embodiment of the present invention;

DESCRIPTION OF EMBODIMENTS

Figure 3:
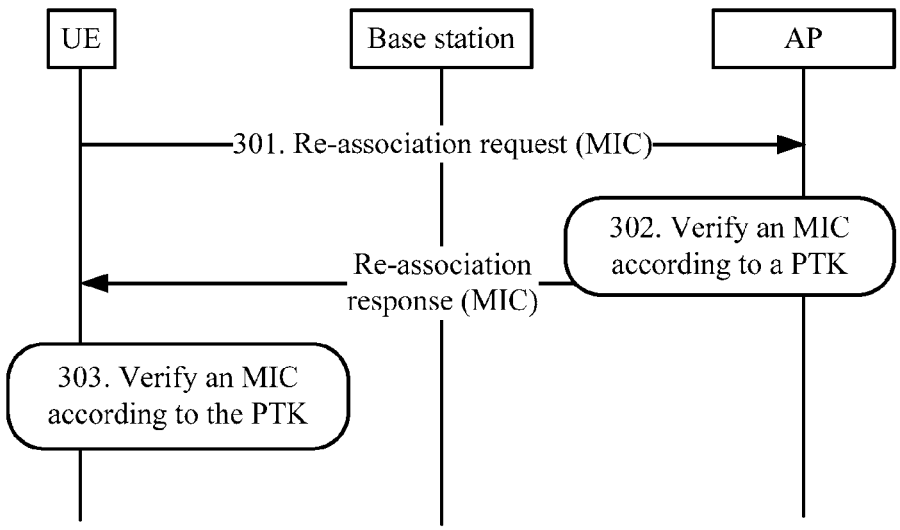
FIG. 3 is a schematic flowchart of a re-association process according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

FIG. 1 is a diagram of a scenario to which an embodiment of the present invention may be applied. As shown in FIG. 1, a base station has a capability of accessing a wireless cellular network or a capability of accessing a wireless mobile communications network, and an access point (Access Point, AP) has a capability of accessing a WLAN. If UE connected to the base station is in coverage of the WLAN, based on factors such as load and measurement, the UE may need to perform offloading to the WLAN, to relieve network congestion.

It should be understood that the foregoing wireless cellular network may be any one of the following communications systems, such as a Global System for Mobile Communications (GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunication System (Universal Mobile Telecommunication System, UMTS), and a Worldwide Interoperability for Microwave Access (Worldwide Interoperability for Microwave Access, WiMAX) communications system.

It should be further understood that, in this embodiment of the present invention, the UE may be referred to as a terminal (Terminal), a mobile station (Mobile Station, MS), a mobile terminal (Mobile Terminal), or the like, and the user equipment may communicate with one or more core networks by using a radio access network (Radio Access Network, RAN). For example, the UE may be a mobile phone (or referred to as a "cellular phone"), or a computer having a mobile terminal. For example, the user equipment may also be a portable, pocket-sized, handheld, computer built-in, or in-vehicle mobile apparatus, which exchanges voice and/or data with the radio access network. In this embodiment of the present invention, the base station may be a base transceiver station (Base Transceiver Station, BTS) in GSM or CDMA, or may be a NodeB (NodeB, NB) in WCDMA, or may be an evolved NodeB (ENB or e-NodeB) in LTE, which is not limited in the present invention.

For ease of description, the base station and the UE are used as an example for description in the following embodiments.

To describe an offloading method more clearly and more comprehensibly in the following, some concepts involved in the method are first described as follows:

Security authentication: Access authentication is a solution to WLAN network security. To prevent illegal user access to a WLAN, security authentication needs to be performed on UE before the UE accesses an AP. The security authentication provides an access control capability of the WLAN. If the authentication succeeds, the AP allows the UE to connect to the WLAN; otherwise, the UE is not allowed to connect to the WLAN.

Association: An association (association) process is immediately performed after an authentication process. The association is used for establishing a mapping relationship between UE and an AP, where one UE can be connected to only one AP. When the UE moves from one AP to another AP, re-association (re-association) needs to be performed.

A PMK (Pairwise master key, pairwise master key) is a key source of bidirectional authentication performed between a supplicant (Supplicant) and an authenticator (Authenticator). In this application, the supplicant may be understood as UE, and the authenticator may be understood as an AP.

Key Structure:

In an authentication process, the key structure includes three levels, which are a PMK-R0, a PMK-R1, and a PTK.

The PMK-R0 is a first-level key, is derived by using an MSK (master session key, master session key), and is stored by a holder of the PMK-R0, where the holder may be an R0KH and an S0KH. The R0KH and the S0KH are described in detail in the following.

The PMK-R1 is a second-level key, is jointly derived by the S0KH and the R0KH, and is stored by a holder of the PMK-R1, where the holder may be an R1KH and an S1KH. The R1KH and the S1KH are described in detail in the following.

The PTK (Pairwise transient key, pairwise transient key) is a third-level key, and is jointly derived by the S1KH and the R1KH. That is, the PTK is a key generated by using a PMK and is used for encryption and integrity verification. In the three-level key structure, the PMK may be a PMK-R0 or a PMK-R1. In this application, the PTK may be directly used for bidirectional authentication between UE and an AP.

The R0KH and the R1KH are key management entities of the authenticator. Calculation of the PMK-R0 and the PMK-R1 is controlled by the R0KH, and calculation of the PTK is controlled by the R1KH. An R0KH-ID and an R1KH-ID are respectively identifiers of the R0KH and the R1KH, where the R0KH-ID may be an NAS (non-access stratum, non-access stratum) ID of the authenticator, and the R1KH-ID may be a MAC (media access control, Media Access Control) address of the authenticator. The S0KH and the S1KH are key management entities of the supplicant, and functions of the S0KH and the S1KH are respectively similar to those of the R0KH and the R1KH. An S0KH-ID and an S1KH-ID are respectively identifiers of the S0KH and the S1KH, and may be MAC addresses of the supplicant.

An MIC (message integrity code, message integrity verification code) is a hash value calculated over a group of data that needs to be protected, and is used to prevent data tampering.

FIG. 2 shows a schematic flowchart of an offloading method 200 according to an embodiment of the present invention. The method 200 is described from a perspective of UE, including:

S210. User equipment receives an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point.

S220. The user equipment performs the bidirectional authentication with the access point according to the security parameter sent by the base station to the user equipment, so that the user equipment accesses the access point according to the access method and performs offloading to the wireless local area network.

In this embodiment of the present invention, when the UE needs to perform offloading to the WLAN, the base station sends the offloading indication to the UE to indicate the access method and the security parameter that are used by the UE to access the AP in the WLAN. In addition, the base station further sends the foregoing security parameter to the AP. That is, the base station separately sends, to the UE and the AP, the security parameter used by the UE to access the AP, which avoids a delay caused when the UE negotiates the security parameter with the AP by means of an 802.1x authentication process and a four-way handshake process, and can ensure that the UE performs rapid offloading to the AP. In the prior art, to access the AP, the UE interacts and negotiates with the AP by means of the 802.1x authentication process and the four-way handshake process to acquire the foregoing security parameter. The foregoing processes include: the UE acquires an intermediate parameter by using an authentication server and sends the intermediate parameter to the AP, and then the UE and the AP separately generate the final security parameter used for UE access, and therefore, a delay is relatively large.

Therefore, according to the offloading method in this embodiment of the present invention, an AP is accessed according to an access method indicated by a base station in an offloading indication and a security parameter included in the offloading indication, so that rapid offloading to a WLAN can be performed, an access delay is reduced, and user experience can be improved.

Optionally, in an embodiment of the present invention, the base station may indicate, in the offloading indication in an implicit or explicit manner, the access method used by the UE to access the AP. When the implicit manner is used, the UE can determine, according to the acquired security parameter, an access manner for accessing the AP, and use the security parameter to complete the bidirectional authentication. When the explicit manner is used, the UE determines, according to an indicated access manner, a manner for accessing the AP, and uses the corresponding security parameter to complete the bidirectional authentication.

The following describes in detail different implementation manners in which the UE performs offloading to the wireless local area network according to the offloading indication.

Optionally, in an embodiment of the present invention, an offloading method is indicated in the offloading indication in an implicit manner. That is, the offloading indication includes the foregoing security parameter, but does not include a specific access method, where the security parameter may be used to indicate the access method for the UE to access the foregoing AP. For example, according to the security parameter, the UE may directly perform the bidirectional authentication with the AP and access the AP. In the foregoing implicit indication manner, overheads of an air interface between the UE and the base station can be reduced, and the UE determines, by itself by using the security parameter and on a premise that an information element in the offloading indication does not increase, a manner for accessing the AP, which simplifies configuration performed by the base station.

Optionally, in another embodiment of the present invention, an offloading method is indicated in the offloading indication in an explicit manner. That is, the offloading indication includes the access method and the security parameter, where the access method is the access method for the UE to access the AP, and the security parameter is a security parameter corresponding to the access method and is used by the UE and the AP to perform the bidirectional authentication. In an implementation manner of this embodiment, the access method may be indicated in the offloading indication by using a bit map (bit map). For example, a bit (bit) may be used to indicate a specific access method. When a value of the bit is 1, the UE is instructed to access the AP by using the security parameter included in the offloading indication, and in this case, the offloading indication sent by the base station needs to further include the security parameter. When a value of the bit is 0, the UE is instructed to access the AP by using a given access method. For example, the UE is instructed to access the AP by using a Simultaneous Authentication of Equals (Simultaneous authentication of equals, SAE) access method, or access the AP by using a fast base service set (Base Service Set, BSS) transition (Fast BSS Transition, FT) access method. The SAE access method is an authentication method in which the UE accesses the AP without using an authentication server. A main process of the SAE access method is described as follows: The UE and the AP separately submit a commit (commit) to each other, and after receiving the commit sent by each other, reply a confirm (confirm) message to confirm each other, and the UE and the AP separately generate a PMK and generate a PTK by using the PMK, so as to implement the bidirectional authentication. When the SAE access method is used, the offloading indication may not include the security parameter. The FT access manner is described in detail in the following, and details are not described herein again.

In the foregoing explicit indication manner, values or representation forms that represent different access manners may be predetermined between the UE and the base station, so that the UE can be notified of a specific access manner for accessing the AP, and it can be avoided that the UE determines the specific access manner by itself according to the security parameter, which simplifies configuration performed by the UE.

In this embodiment of the present invention, the security parameter included in the offloading indication sent by the base station to the UE may be determined after the base station negotiates with the AP, or may be determined by the base station itself, and the UE may directly access the AP according to the security parameter acquired from the base station, which reduces a time for acquiring the security parameter in an access process, thereby reducing an access delay. For example, on a basis that the base station determines the security parameter after negotiating with the AP, the base station may send a first security parameter to the AP, and when the AP determines that the first security parameter is feasible, the AP receives the security parameter and applies the security parameter to a process of the bidirectional authentication with the UE. When the AP determines that the first security parameter is not feasible, the AP feeds back the foregoing situation to the base station. In this case, the base station sends an updated second security parameter to the AP again, and so on. For another example, on a basis that the base station determines the security parameter by itself, the base station may directly send the security parameter to the UE and the AP separately, so that the security parameter is directly applied to a process of the bidirectional authentication between the AP and the UE.

In this embodiment of the present invention, the security parameter sent by the base station to the UE may include various different parameters. Accordingly, specific implementation manners in which the UE and the AP perform the bidirectional authentication according to the security parameter are also different, which are separately described in detail in the following.

Optionally, in an implementation manner, the security parameter includes a PTK.

In this case, that the UE performs the bidirectional authentication with the AP according to the security parameter sent by the base station to the UE includes:

sending, by the user equipment, a first message integrity code (Message Integrity Code, MIC) generated by using the pairwise transient key in the offloading indication to the access point, so that the access point determines, according to the first message integrity code and a second message integrity code, whether authentication on the user equipment succeeds, where the second message integrity code is generated by the access point according to the pairwise transient key acquired by the base station;

when the access point determines that the authentication on the user equipment succeeds, receiving, by the user equipment, a third message integrity code sent by the access point, where the third message integrity code is generated by the access point according to the pairwise transient key acquired by the base station;

determining, by the user equipment according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, completing, by the user equipment, the bidirectional authentication with the access point.

In this embodiment, the base station separately sends the PTK to the UE and the AP. For example, after the base station determines the PTK after negotiating with the AP, the AP may acquire the PTK, and the base station adds the PTK to the offloading indication sent to the UE. When receiving the offloading indication that includes the PTK, the UE directly performs the bidirectional authentication process with the AP according to the PTK sent by the base station, so as to access the AP. For example, the UE and the AP separately send a message integrity code to each other by means of a re-association (Re-association) process, to perform the bidirectional authentication.

The following describes the re-association process in detail with reference to an example shown in FIG. 3.

301. UE sends a re-association request (Re-association Request) to an AP, where the re-association request includes an MIC (represented as a first message integrity code) generated according to a PTK sent by a base station to the UE and the Re-association Request.

302. After receiving the Re-association Request, the AP generates an MIC (represented as a second message integrity code) by using a PTK stored by the AP (the PTK is obtained after the AP negotiates with the base station or is determined by the base station itself and is sent to the AP) and the received Re-association Request, compares the MIC with the received MIC, and if the MIC and the received MIC are the same, considers that authentication succeeds and sends a re-association response (Re-association Response) to the UE, where the re-association response includes an MIC (represented as a third message integrity code) generated according to the PTK stored by the AP and the Re-association response.

303. After receiving the Re-association Response, the UE generates an MIC (represented as a fourth message integrity code) by using the PTK sent by the base station to the UE and the received Re-association Response, and compares the MIC with the received MIC, where if the MIC and the received MIC are the same, bidirectional authentication succeeds, so that normal data transmission can be performed between the UE and the AP.

Optionally, in another implementation manner, the security parameter includes a pairwise master key (Pairwise master key, PMK).

In this case, that the UE performs the bidirectional authentication with the AP according to the security parameter sent by the base station to the UE includes:

acquiring, by the user equipment, a first pairwise transient key according to the pairwise master key in the offloading indication;

sending, by the user equipment, a first message integrity code generated by using the first pairwise transient key to the access point, so that the access point determines, according to the first message integrity code and a second message integrity code, whether authentication on the user equipment succeeds, where the second message integrity code is generated by the access point according to a second pairwise transient key, and the second pairwise transient key is generated by the access point according to the pairwise master key acquired by the base station;

when the access point determines that the authentication on the user equipment succeeds, receiving, by the user equipment, a third message integrity code sent by the access point, where the third message integrity code is generated by the access point according to the second pairwise transient key;

determining, by the user equipment according to the third message integrity code and a fourth message integrity code, whether authentication on the access point succeeds, where the fourth message integrity code is generated by the user equipment according to the first pairwise transient key; and when the user equipment determines that the authentication on the access point succeeds, completing, by the user equipment, the bidirectional authentication with the access point.

A difference between this implementation manner and the former implementation manner lies in that the base station sends the PMK to the UE and the AP. Because a PTK is finally required by the UE and the AP to perform the bidirectional authentication, the UE and the AP need to first separately generate the PTK according to the acquired PMK, and then perform the bidirectional authentication according to the PTK, so that the UE accesses the AP.

Specifically, the UE may determine the PTK according to the PMK, an authenticator nonce (Authenticator nonce, ANonce), and a supplicant nonce (Supplicant nonce, SNonce). The ANonce and the SNonce may be determined by the UE and the AP by means of an authentication (authentication) process, or may be acquired by the UE from the base station. For example, the base station may add the ANonce and the SNonce to the security parameter sent to the UE. For another example, when the security parameter sent by the base station to the UE does not include the ANonce and the SNonce, the UE and the AP may determine the foregoing ANonce and the SNonce by means of the authentication process. In the latter manner, after receiving the offloading indication that includes the PMK, the UE first initiates the authentication process, and adds the SNonce to an authentication request (authentication request) sent to the AP, and the AP adds the ANonce to an authentication response (authentication response) sent to the UE. In this way, both the UE and the AP can determine the PTK according to the PMK, the ANonce, and the SNonce. After determining the PTK, the UE and the AP performs the bidirectional authentication process according to the PTK.

For the bidirectional authentication process, reference may be made to the re-association process described above, and details are not described herein again.

It may be understood that because the base station may determine the ANonce and the SNonce, the base station may directly send the PTK to one of the UE and the AP, and send the PMK to the other party. For example, the base station may send the PMK to the UE and send the PTK to the AP. In this case, the UE may determine the PTK by itself according to the PMK, the acquired ANonce, and the acquired SNonce. Alternatively, the base station may send the PTK to the UE and send the PMK to the AP. In this case, similarly, the AP may determine the PTK by itself according to the PMK, the acquired ANonce, and the acquired SNonce, and details are not described herein again.

Optionally, in another implementation manner, the security parameter includes:

at least one of an MSK, a PMK-R0, and a PMK-R1; and
at least one of an R0KH-ID and an R1KH-ID.

This implementation manner is an FT access manner, and in this case, that the user equipment performs the bidirectional authentication with the access point according to the security parameter sent by the base station to the user equipment includes:

generating, by the user equipment, a pairwise transient key according to the at least one of the MSK, the PMK-R0, and the PMK-R1 and the at least one of the R0KH-ID and the R1KH-ID that are sent by the base station; and performing, by the user equipment, the bidirectional authentication with the access point according to the pairwise transient key.

Optionally, if the R0KH-ID and the R1KH-ID corresponding to the AP accessed by the UE are always fixed, for example, if the UE accesses a same AP each time performing offloading, when the UE has acquired the R0KH-ID and the R1KH-ID of the AP in a previous offloading process, the security parameter in the current offloading indication may not include the R0KH-ID and the R1KH-ID. For another example, when values of the R0KH-ID and the R1KH-ID are the same, one of the R0KH-ID and the R1KH-ID may be selected and carried in the security parameter.

Optionally, the security parameter may include any one of the PTK, the PMK-R1, and the PMK-R0. For example, the user equipment may derive the PMK-R0 according to the MSK and with reference to the R0KH-ID, or derive the PMK-R1 according to the PMK-R0 and with reference to the R1KH-ID, or derive the PTK according to the PMK-R1 and with reference to the ANonce and the SNonce.

Optionally, the security parameter may include the ANonce and the SNonce, and in this case, the PTK required for the authentication may be directly determined without the authentication process between the UE and the AP. When the security parameter does not include the ANonce or the SNonce, the UE and the AP may determine the ANonce and the SNonce by means of the authentication (authentication) process. How to determine the ANonce and the SNonce is described above in detail, and details are not described herein again.

In embodiments of the present invention, the security parameter may further include an encryption algorithm, that is, the UE may acquire the encryption algorithm from the base station. In this way, the encryption algorithm does not need to be further determined in a process of accessing the AP. The encryption algorithm may be used to encrypt and decrypt exchange information when the UE communicates with the AP. For specific constitution of the encryption algorithm, reference may be made to the prior art, and no limit is set herein.

In this embodiment of the present invention, optionally, after the UE accesses the foregoing AP (represented as a first AP herein) from the base station, if the UE needs to be handed over to a second AP, the UE may derive, according to the security parameter obtained from the base station, a security parameter required for accessing the second AP. Correspondingly, the second AP may acquire, from the first AP, the security parameter required by the UE to access the second AP, or the first AP derives the security parameter required by the second AP and sends the security parameter to the second AP. Therefore, the UE and the second AP may rapidly complete a bidirectional authentication process by using the acquired security parameter, so that the UE is rapidly handed over from the first AP to the second AP.

According to the offloading method in this embodiment of the present invention, an AP is accessed according to a security parameter added by a base station to an offloading indication, so that rapid offloading to a WLAN can be performed, an access delay is reduced, and user experience can be improved.

The foregoing describes the offloading method in the embodiments of the present invention in detail from a perspective of UE, and the following describes the offloading method in the embodiments of the present invention from a perspective of a base station.

Figure 4:
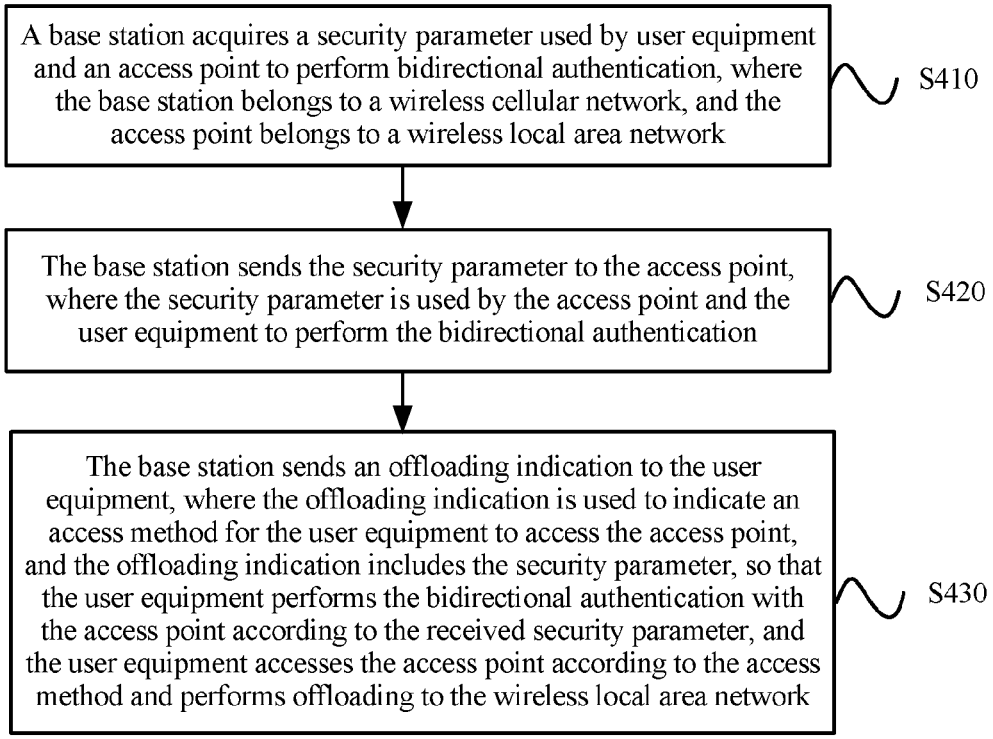
FIG. 4 is a schematic flowchart of an offloading method according to another embodiment of the present invention.

FIG. 4 shows a schematic flowchart of an offloading method 400 according to another embodiment of the present invention. The method 400 is described from a perspective of a base station, including:

S410. A base station acquires a security parameter used by user equipment and an access point to perform bidirectional authentication, where the base station belongs to a wireless cellular network, and the access point belongs to a wireless local area network.

S420. The base station sends the security parameter to the access point, where the security parameter is used by the access point and the user equipment to perform the bidirectional authentication.

S430. The base station sends an offloading indication to the user equipment, where the offloading indication is used to indicate an access method for the user equipment to access the access point, and the offloading indication includes the security parameter, so that the user equipment performs the bidirectional authentication with the access point according to the received security parameter, and the user equipment accesses the access point according to the access method and performs offloading to the wireless local area network.

In this embodiment of the present invention, when the UE needs to perform offloading to the WLAN, the base station sends the offloading indication to the UE to indicate the access method for the UE to access the AP in the WLAN and the security parameter used by the UE and the AP to perform the bidirectional authentication. In addition, the base station further sends the foregoing security parameter to the AP. The UE accesses the AP according to the access method and the security parameter that are indicated by the base station. In this way, the base station separately sends, to the UE and the AP, the security parameter used by the UE to access the AP, which avoids a delay caused when the UE negotiates the security parameter with the AP by means of an 802.1x authentication process and a four-way handshake process, and can ensure that the UE performs rapid offloading to the WLAN and reduce an access delay, thereby improving user experience.

In this embodiment of the present invention, optionally, that a base station acquires a security parameter used by user equipment and an access point to perform bidirectional authentication includes:

determining, by the base station after negotiating with the access point, the security parameter used by the user equipment and the access point to perform the bidirectional authentication; or determining, by the base station itself, the security parameter used by the user equipment and the access point to perform the bidirectional authentication.

In this embodiment of the present invention, the security parameter included in the offloading indication sent by the base station to the UE may be determined after the base station negotiates with the AP. Optionally, the security parameter may be determined by the base station itself and sent to the AP. In this way, the UE may directly access the AP according to the security parameter acquired from the base station, which reduces a time for acquiring the security parameter in an access process, thereby reducing an access delay.

Optionally, in this embodiment of the present invention, the base station may indicate, in the offloading indication in an implicit or explicit manner, the access method used by the UE to access the AP. When the implicit manner is used, the UE can determine, according to the acquired security parameter, an access manner for accessing the AP, and use the security parameter to complete the bidirectional authentication. When the explicit manner is used, the UE determines, according to an indicated access manner, a manner for accessing the AP, and uses the corresponding security parameter to complete the bidirectional authentication.

Optionally, in an embodiment of the present invention, an offloading method is indicated in the offloading indication in an implicit manner. That is, the offloading indication includes the foregoing security parameter, but does not include a specific access method, where the security parameter may be used to indicate the access method for the UE to access the foregoing AP. For example, according to the security parameter, the UE may directly perform the bidirectional authentication with the AP and access the AP. In the foregoing implicit indication manner, overheads of an air interface between the UE and the base station can be reduced, and the UE determines, by itself by using the security parameter and on a premise that an information element in the offloading indication does not increase, a manner for accessing the AP, which simplifies configuration performed by the base station.

Optionally, in another embodiment of the present invention, an offloading method is indicated in the offloading indication in an explicit manner. That is, the offloading indication includes the access method and the security parameter, where the access method is the access method for the UE to access the AP, and the security parameter is a security parameter corresponding to the access method and is used by the UE and the AP to perform the bidirectional authentication. For a specific implementation manner, reference may be made to corresponding descriptions of the method embodiment executed by UE, and details are not described herein again.

In the foregoing explicit indication manner, values or representation forms that represent different access manners may be predetermined between the UE and the base station, so that the UE can be notified of a specific access manner for accessing the AP, and it can be avoided that the UE determines the specific access manner by itself according to the security parameter, which simplifies configuration performed by the UE.

In this embodiment of the present invention, optionally, the security parameter includes a PTK, where the PTK is used by the UE and the AP to perform the bidirectional authentication.

In this embodiment, the base station separately sends the PTK to the UE and the AP. For example, after the base station determines the PTK after negotiating with the AP, the AP may acquire the PTK, and the base station adds the PTK to the offloading indication sent to the UE. When receiving the offloading indication that includes the PTK, the UE accesses the AP according to the PTK sent by the base station. Because the UE acquires the PTK from the base station, the UE may directly perform a bidirectional authentication process with the AP. For the specific bidirectional authentication process, reference may be made to the method embodiment executed by UE, and details are not described herein again.

In this embodiment of the present invention, optionally, the security parameter includes a PMK, where the PMK is used by the UE and the AP to determine a PTK, and the PTK is used by the UE and the AP to perform the bidirectional authentication. Because the PTK is finally required by the UE and the AP to perform the bidirectional authentication, the UE needs to first generate the PTK according to the PMK. In this embodiment, when receiving the offloading indication that includes the PMK, the UE first determines the PTK according to the PMK, and then performs a bidirectional authentication process according to the PTK.

In this embodiment of the present invention, optionally, the security parameter includes:

at least one of an MSK, a PMK-R0, and a PMK-R1; and at least one of an R0KH-ID and an R1KH-ID.

The security parameter is used by the user equipment and the access point to determine a pairwise transient key, where the pairwise transient key is used by the user equipment and the access point to perform the bidirectional authentication.

In embodiments of the present invention, the security parameter may further include an encryption algorithm. The UE may acquire the encryption algorithm from the base station. In this way, the encryption algorithm does not need to be further determined in a process of accessing the AP.

It should be understood that in this embodiment of the present invention, interaction among the UE, the base station, and the AP, related characteristics, functions, and the like that are described on a UE side are corresponding to descriptions on a base station side. For brevity, details are not described herein again.

According to the offloading method in this embodiment of the present invention, an offloading indication that includes a security parameter is sent to UE, so that the UE can perform rapid offloading to a WLAN, an access delay is reduced, and user experience can be improved.

The foregoing separately describes the offloading method in the embodiments of the present invention from a perspective of UE and a perspective of a base station, and the following describes the offloading method in the embodiments of the present invention from a perspective of an AP.

FIG. 5 shows a schematic flowchart of an offloading method 500 according to still another embodiment of the present invention. The method 500 is described from a perspective of an AP, including:

S510. An access point receives a security parameter sent by a base station, where the security parameter is used by the access point and user equipment to perform bidirectional authentication, the base station belongs to a wireless cellular network, the access point belongs to a wireless local area network, the security parameter is further carried in an offloading indication sent by the base station to the user equipment, and the offloading indication is used to indicate an access method for the user equipment to access the access point.

S520. The access point performs the bidirectional authentication with the user equipment according to the security parameter sent by the base station to the access point, so that the user equipment accesses the access point according to the access method and performs offloading to the wireless local area network.

In this embodiment of the present invention, the AP receives the security parameter sent by the base station. When the UE performs offloading from the base station to the WLAN, the base station adds the security parameter to the offloading indication sent to the UE, and sends the offloading indication to the UE. In this way, the AP and the UE may perform the bidirectional authentication according to the security parameter, so that the UE accesses the AP to implement offloading to the WLAN. Therefore, a delay caused when the UE negotiates the security parameter with the AP by means of an 802.1x authentication process and a four-way handshake process can be avoided, and it can be ensured that the UE performs rapid offloading to the AP.

Therefore, according to the offloading method in this embodiment of the present invention, bidirectional authentication is performed with UE according to a security parameter that is sent by a base station and is used by an AP and the UE to perform the bidirectional authentication, so that the UE can perform rapid offloading to a WLAN, an access delay can be reduced, and user experience can be improved.

In an embodiment of the present invention, optionally, the security parameter includes a PTK.

In this case, that the access point performs the bidirectional authentication with the user equipment according to the security parameter sent by the base station to the access point includes:

receiving, by the access point, a first message integrity code that is sent by the user equipment and is generated by using the pairwise transient key in the offloading indication;

determining, by the access point according to the first message integrity code and a second message integrity code, whether authentication on the user equipment succeeds, where the second message integrity code is generated by the access point according to the acquired pairwise transient key; and when determining that the authentication on the user equipment succeeds, sending, by the access point, a third message integrity code generated by using the acquired pairwise transient key to the user equipment, so that the user equipment determines, according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, completing, by the access point, the bidirectional authentication with the user equipment.

In another embodiment of the present invention, optionally, the security parameter includes a PMK.

In this case, that the access point performs the bidirectional authentication with the user equipment according to the security parameter sent by the base station to the access point includes:

receiving, by the access point, a first message integrity code that is sent by the user equipment and is generated by using a first pairwise transient key, where the first pairwise transient key is generated by the user equipment according to the pairwise master key in the offloading indication;

acquiring, by the access point, a second pairwise transient key according to the pairwise master key sent by the base station;

determining, by the access point according to the first message integrity code and a second message integrity code, whether authentication on the user equipment succeeds, where the second message integrity code is generated by the access point according to the second pairwise transient key; and when determining that the authentication on the user equipment succeeds, sending, by the access point, a third message integrity code generated by using the second pairwise transient key to the user equipment, so that the user equipment determines, according to the third message integrity code and a fourth message integrity code, whether authentication on the access point succeeds, where the fourth message integrity code is generated by the user equipment according to the first pairwise transient key; and when the user equipment determines that the authentication on the access point succeeds, completing, by the access point, the bidirectional authentication with the user equipment.

Optionally, in an embodiment of the present invention, the method further includes:

receiving, by the access point, an authentication request sent by the user equipment, where the authentication request includes a supplicant nonce;

sending, by the access point, an authentication response to the user equipment, where the authentication response includes an authenticator nonce; and the acquiring, by the access point, a second pairwise transient key according to the pairwise master key sent by the base station includes:

acquiring, by the access point, the second pairwise transient key according to the pairwise master key sent by the base station, the authenticator nonce, and the supplicant nonce.

In the foregoing embodiment, the bidirectional authentication may be implemented by means of a re-association process. For a specific implementation manner, reference may be made to corresponding descriptions on a UE side, and details are not described herein again.

Optionally, in another embodiment of the present invention, the security parameter includes:

at least one of an MSK, a PMK-R0, and a PMK-R1; and at least one of an R0KH-ID and an R1KH-ID.

In this case, that the access point performs the bidirectional authentication with the user equipment according to the security parameter sent by the base station to the access point includes:

generating, by the access point, a pairwise transient key according to the at least one of the MSK, the PMK-R0, and the PMK-R1 and the at least one of the R0KH-ID and the R1KH-ID that are sent by the base station; and performing, by the access point, the bidirectional authentication with the user equipment according to the pairwise transient key.

In embodiments of the present invention, the security parameter may further include an encryption algorithm. In this way, the encryption algorithm does not need to be further determined in a process in which the UE accesses the AP.

It should be understood that in this embodiment of the present invention, interaction among the UE, the base station, and the AP, related characteristics, functions, and the like that are described on a UE side are corresponding to descriptions on an AP side. For brevity, details are not described herein again.

According to the offloading method in this embodiment of the present invention, bidirectional authentication is performed with UE according to a security parameter sent by a base station, so that the UE can perform rapid offloading to a WLAN, an access delay can be reduced, and user experience can be improved.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

The foregoing describes the offloading method according to the embodiments of the present invention in detail with reference to FIG. 1 to FIG. 5, and the following describes user equipment, a base station, and an access point according to the embodiments of the present invention with reference to FIG. 6 to FIG. 11.

FIG. 6 shows a schematic block diagram of user equipment 600 according to an embodiment of the present invention. As shown in FIG. 6, the user equipment 600 includes:

a receiving unit 610, configured to receive an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point; and an access unit 620, configured to perform the bidirectional authentication with the access point according to the security parameter received by the receiving unit 610, so that the user equipment accesses the access point according to the access method and performs offloading to the wireless local area network.

According to the user equipment in this embodiment of the present invention, an AP is accessed according to an access method indicated by a base station in an offloading indication and a security parameter included in the offloading indication, so that rapid offloading to a WLAN can be performed, an access delay is reduced, and user experience can be improved.

Optionally, in this embodiment of the present invention, the base station may indicate, in the offloading indication in an implicit or explicit manner, the access method used by the UE to access the AP. When the implicit manner is used, the UE can determine, according to the acquired security parameter, an access manner for accessing the AP, and use the security parameter to complete the bidirectional authentication. When the explicit manner is used, the UE determines, according to an indicated access manner, a manner for accessing the AP, and uses the corresponding security parameter to complete the bidirectional authentication.

Optionally, in an embodiment of the present invention, an offloading method is indicated in the offloading indication in an implicit manner. That is, the offloading indication includes the foregoing security parameter, but does not include a specific access method, where the security parameter may be used to indicate the access method for the UE to access the foregoing AP. For example, according to the security parameter, the UE may directly perform the bidirectional authentication with the AP and access the AP. In the foregoing implicit indication manner, overheads of an air interface between the UE and the base station can be reduced, and the UE determines, by itself by using the security parameter and on a premise that an information element in the offloading indication does not increase, a manner for accessing the AP, which simplifies configuration performed by the base station.

Optionally, in another embodiment of the present invention, an offloading method is indicated in the offloading indication in an explicit manner. That is, the offloading indication includes the access method and the security parameter, where the access method is the access method for the UE to access the AP, and the security parameter is a security parameter corresponding to the access method and is used by the UE and the AP to perform the bidirectional authentication. In the foregoing explicit indication manner, values or representation forms that represent different access manners may be predetermined between the UE and the base station, so that the UE can be notified of a specific access manner for accessing the AP, and it can be avoided that the UE determines the specific access manner by itself according to the security parameter, which simplifies configuration performed by the UE.

In this embodiment of the present invention, optionally, the security parameter is determined after the base station negotiates with the access point, or is determined by the base station itself.

Optionally, in an implementation manner, the security parameter includes a pairwise transient key.

In a case in which the security parameter includes the pairwise transient key, the user equipment 600 further includes:

a sending unit 630, configured to send a first message integrity code generated by using the pairwise transient key in the offloading indication to the access point, so that the access point determines, according to the first message integrity code and a second message integrity code, whether authentication on the user equipment succeeds, where the second message integrity code is generated by the access point according to the pairwise transient key acquired by the base station;

when the access point determines that the authentication on the user equipment succeeds, the receiving unit 610 is further configured to receive a third message integrity code sent by the access point, where the third message integrity code is generated by the access point according to the pairwise transient key acquired by the base station; and the access unit 620 is specifically configured to:

determine, according to the third message integrity code and a fourth message integrity code, whether authentication on the access point succeeds, where the fourth message integrity code is generated by using the pairwise transient key in the offloading indication; and when determining that the authentication on the access point succeeds, complete the bidirectional authentication with the access point.

Optionally, in this implementation manner, the sending unit 630 is further configured to send a re-association request to the access point, so that the access point generates the second message integrity code according to the re-association request and the security parameter acquired from the base station;

the access unit 620 is further configured to generate the first message integrity code according to the security parameter in the offloading indication and the re-association request;

the receiving unit 610 is further configured to receive a re-association response sent by the access point; and the access unit 620 is further configured to generate the fourth message integrity code according to the re-association response and the security parameter in the offloading indication.

Optionally, in another implementation manner, the security parameter includes a pairwise master key.

In a case in which the security parameter includes the pairwise master key, the user equipment 600 further includes:

a sending unit 630, configured to send a first message integrity code generated by using the first pairwise transient key to the access point, so that the access point determines, according to the first message integrity code and a second message integrity code, whether authentication on the user equipment succeeds, where the first pairwise transient key is acquired according to the pairwise master key in the offloading indication, the second message integrity code is generated by the access point according to a second pairwise transient key, and the second pairwise transient key is generated by the access point according to the pairwise master key acquired by the base station;

when the access point determines that the authentication on the user equipment succeeds, the receiving unit 610 is further configured to receive a third message integrity code sent by the access point, where the third message integrity code is generated by the access point according to the second pairwise transient key; and the access unit 620 is specifically configured to:

determine, according to the third message integrity code and a fourth message integrity code, whether authentication on the access point succeeds, where the fourth message integrity code is generated by using the first pairwise transient key; and when determining that the authentication on the access point succeeds, complete the bidirectional authentication with the access point.

Optionally, in this implementation manner, the sending unit 630 is further configured to send a re-association request to the access point, so that the access point generates the second message integrity code according to the re-association request and the security parameter acquired from the base station;

the access unit 620 is further configured to generate the first message integrity code according to the security parameter in the offloading indication and the re-association request;

the receiving unit 610 is further configured to receive a re-association response sent by the access point; and the access unit 620 is further configured to generate the fourth message integrity code according to the re-association response and the security parameter in the offloading indication.

Optionally, in this implementation manner, the sending unit 630 is further configured to send an authentication request to the access point, where the authentication request includes a supplicant nonce;

the receiving unit 610 is further configured to receive an authentication response sent by the access point, where the authentication response includes an authenticator nonce; and the access unit 620 is further configured to acquire the first pairwise transient key according to the pairwise master key in the offloading indication, the authenticator nonce, and the supplicant nonce. The user equipment 600 according to this embodiment of the present invention may be corresponding to the user equipment in the offloading method according to the embodiments of the present invention, and the foregoing and other operations and/or functions of units in the user equipment 600 are separately used to implement corresponding procedures of the methods in FIG. 1 to FIG. 5. For brevity, details are not described herein again.

According to the user equipment in this embodiment of the present invention, an AP is accessed according to a security parameter added by a base station to an offloading indication, so that rapid offloading to a WLAN can be performed, an access delay is reduced, and user experience can be improved.

FIG. 7 shows a schematic block diagram of a base station 700 according to an embodiment of the present invention. As shown in FIG. 7, the base station 700 includes:

an acquiring unit 710, configured to acquire a security parameter used by user equipment and an access point to perform bidirectional authentication, where the base station belongs to a wireless cellular network, and the access point belongs to a wireless local area network; and a sending unit 720, configured to: send the security parameter to the access point, where the security parameter is used by the access point and the user equipment to perform the bidirectional authentication; and send an offloading indication to the user equipment, where the offloading indication is used to indicate an access method for the user equipment to access the access point, and the offloading indication includes the security parameter, so that the user equipment performs the bidirectional authentication with the access point according to the received security parameter, and the user equipment accesses the access point according to the access method and performs offloading to the wireless local area network.

According to the base station in this embodiment of the present invention, an offloading indication that indicates an access method used by UE to access an AP and includes a security parameter is sent to the UE, so that the UE accesses the AP according to the security parameter. Therefore, the UE can perform rapid offloading to a WLAN, an access delay can be reduced, and user experience can be improved.

In this embodiment of the present invention, optionally, the security parameter includes a pairwise transient key, where the pairwise transient key is used by the user equipment and the access point to perform the bidirectional authentication.

In this embodiment of the present invention, optionally, the security parameter includes a pairwise master key, where the pairwise master key is used by the user equipment and the access point to determine a pairwise transient key, and the pairwise transient key is used by the user equipment and the access point to perform the bidirectional authentication.

In this embodiment of the present invention, optionally, the acquiring unit 710 is specifically configured to: determine, after negotiating with the access point, the security parameter used by the user equipment and the access point to perform the bidirectional authentication; or determine, by itself, the security parameter used by the user equipment and the access point to perform the bidirectional authentication.

The base station 700 according to this embodiment of the present invention may be corresponding to the base station in the offloading method according to the embodiments of the present invention, and the foregoing and other operations and/or functions of units in the base station 700 are separately used to implement corresponding procedures of the methods in FIG. 1 to FIG. 5. For brevity, details are not described herein again.

According to the base station in this embodiment of the present invention, an offloading indication that includes a security parameter is sent to UE, so that the UE can perform rapid offloading to a WLAN, an access delay is reduced, and user experience can be improved.

Figure 8:
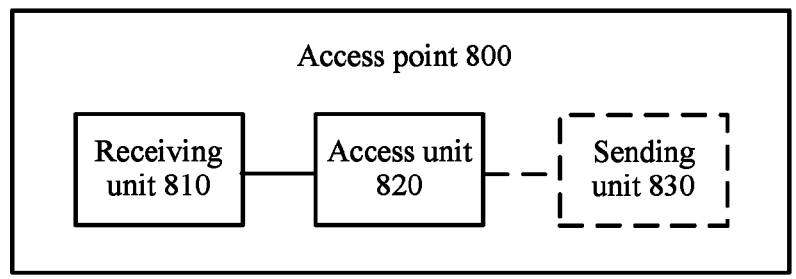
FIG. 8 is a schematic block diagram of an access point according to an embodiment of the present invention.

FIG. 8 shows a schematic block diagram of an access point 800 according to an embodiment of the present invention. As shown in FIG. 8, the access point 800 includes:

a receiving unit 810, configured to receive a security parameter sent by a base station, where the security parameter is used by the access point and user equipment to perform bidirectional authentication, the base station belongs to a wireless cellular network, the access point belongs to a wireless local area network, the security parameter is further carried in an offloading indication sent by the base station to the user equipment, and the offloading indication is used to indicate an access method for the user equipment to access the access point; and an access unit 820, configured to perform the bidirectional authentication with the user equipment according to the security parameter received by the receiving unit 810, so that the user equipment accesses the access point according to the access method and performs offloading to the wireless local area network.

According to the access point in this embodiment of the present invention, bidirectional authentication is performed with UE according to a security parameter that is sent by a base station and is used by an AP and the UE to perform the bidirectional authentication, so that the UE can perform rapid offloading to a WLAN, an access delay can be reduced, and user experience can be improved.

In this embodiment of the present invention, optionally, the security parameter is determined after the base station negotiates with the access point, or is determined by the base station itself.

Optionally, in an implementation manner, the security parameter includes a pairwise transient key.

In a case in which the security parameter includes the pairwise transient key, the receiving unit 810 is further configured to receive a first message integrity code that is sent by the user equipment and is generated by using the pairwise transient key in the offloading indication;

the access unit 820 is specifically configured to determine, according to the first message integrity code and a second message integrity code, whether authentication on the user equipment succeeds, where the second message integrity code is generated by using the pairwise transient key acquired by the receiving unit; and the access point 800 further includes a sending unit 830, configured to: when the access unit 820 determines that the authentication on the user equipment succeeds, send a third message integrity code generated by using the pairwise transient key acquired by the receiving unit 810 to the user equipment, so that the user equipment determines, according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, complete the bidirectional authentication with the user equipment.

Optionally, in this implementation manner, the receiving unit 810 is further configured to receive a re-association request sent by the user equipment, where the re-association request includes the first message integrity code generated by the user equipment by using the security parameter in the offloading indication and the re-association request;

the access unit 820 is further configured to:

generate the second message integrity code according to the re-association request and the security parameter received by the receiving unit; and generate the third message integrity code according to the security parameter received by the receiving unit and a re-association response, where the re-association response is sent by the sending unit to the user equipment; and the sending unit 830 is further configured to send the re-association response to the user equipment, where the re-association response includes the third message integrity code, so that the user equipment generates the fourth message integrity code according to the re-association response and the security parameter in the offloading indication.

Optionally, in another implementation manner, the security parameter includes a pairwise master key.

In a case in which the security parameter includes the pairwise master key, the receiving unit 810 is further configured to receive a first message integrity code that is sent by the user equipment and is generated by using a first pairwise transient key, where the first pairwise transient key is generated by the user equipment according to the pairwise master key in the offloading indication;

the access unit 820 is specifically configured to:

determine, according to the first message integrity code and a second message integrity code, whether authentication on the user equipment succeeds, where the second message integrity code is generated by using a second pairwise transient key, and the second pairwise transient key is generated by using the pairwise master key received by the receiving unit; and the access point 800 further includes a sending unit 830, configured to: when the access unit 820 determines that the authentication on the user equipment succeeds, send a third message integrity code generated by using the second pairwise transient key to the user equipment, so that the user equipment determines, according to the third message integrity code and a fourth message integrity code, whether authentication on the access point succeeds, where the fourth message integrity code is generated by the user equipment according to the first pairwise transient key; and when the user equipment determines that the authentication on the access point succeeds, complete the bidirectional authentication with the user equipment.

Optionally, in this implementation manner, the receiving unit 810 is further configured to receive a re-association request sent by the user equipment, where the re-association request includes the first message integrity code generated by the user equipment by using the security parameter in the offloading indication and the re-association request;

the access unit 820 is further configured to:

generate the second message integrity code according to the re-association request and the security parameter received by the receiving unit; and generate the third message integrity code according to the security parameter received by the receiving unit and a re-association response, where the re-association response is sent by the sending unit to the user equipment; and the sending unit 830 is further configured to send the re-association response to the user equipment, where the re-association response includes the third message integrity code, so that the user equipment generates the fourth message integrity code according to the re-association response and the security parameter in the offloading indication.

Optionally, in this implementation manner, the receiving unit 810 is further configured to receive an authentication request sent by the user equipment, where the authentication request includes a supplicant nonce;

the sending unit 830 is further configured to send an authentication response to the user equipment, where the authentication response includes an authenticator nonce; and the access unit 820 is further configured to acquire the second pairwise transient key according to the pairwise master key received by the receiving unit, the authenticator nonce, and the supplicant nonce.

The access point 800 according to this embodiment of the present invention may be corresponding to the access point in the offloading method according to the embodiments of the present invention, and the foregoing and other operations and/or functions of units in the access point 800 are separately used to implement corresponding procedures of the methods in FIG. 1 to FIG. 5. For brevity, details are not described herein again.

According to the AP in this embodiment of the present invention, bidirectional authentication is performed with UE according to a security parameter sent by a base station, so that the UE can perform rapid offloading to a WLAN, an access delay can be reduced, and user experience can be improved.

Figure 9:
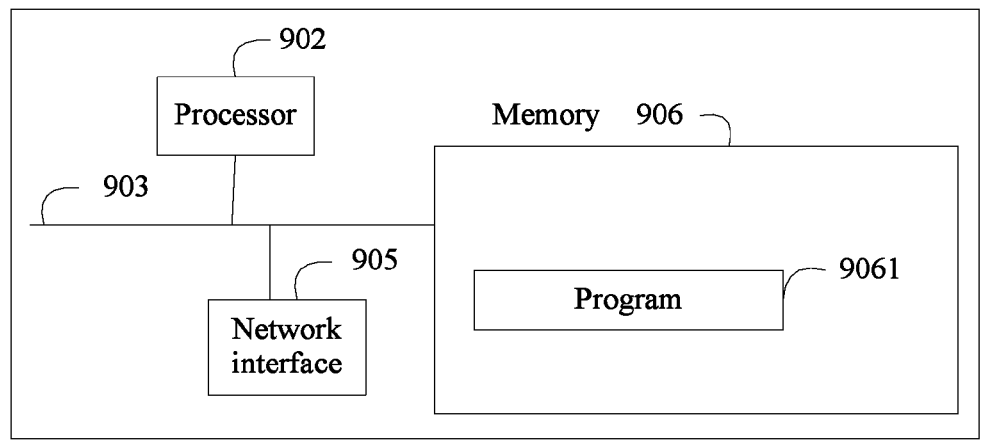
FIG. 9 is a schematic structural diagram of user equipment according to another embodiment of the present invention.

FIG. 9 shows a structure of user equipment according to another embodiment of the present invention. The user equipment includes at least one processor 902 (for example, a CPU), at least one network interface 905 or another communications interface, a memory 906, and at least one communications bus 903 that is configured to implement connection and communication between these apparatuses. The processor 902 is configured to execute an executable module, such as a computer program, stored in the memory 906. The memory 906 may include a high-speed random access memory (RAM: Random Access Memory), and may further include a non-volatile memory (non-volatile memory), such as at least one magnetic disk memory. Communication and connection between the user equipment and at least one other network element is implemented by using the at least one network interface 905 (which may be wired or wireless).

In some implementation manners, the memory 906 stores a program 9061, and the processor 902 executes the program 9061 to execute the following operations:

receiving, by using the network interface, an offloading indication sent by a base station, where the offloading indication is used to indicate an access method for the user equipment to access an access point, the offloading indication includes a security parameter used by the user equipment and the access point to perform bidirectional authentication, the access point belongs to a wireless local area network, the base station belongs to a wireless cellular network, and the security parameter is further sent by the base station to the access point; and performing the bidirectional authentication with the access point according to the security parameter sent by the base station to the user equipment, so that the user equipment accesses the access point according to the access method and performs offloading to the wireless local area network.

Optionally, in a case in which the security parameter includes a pairwise transient key, the processor is specifically configured to:

send, by using the network interface, a first message integrity code generated by using the pairwise transient key in the offloading indication to the access point, so that the access point determines, according to the first message integrity code and a second message integrity code, whether authentication on the user equipment succeeds, where the second message integrity code is generated by the access point according to the pairwise transient key acquired by the base station;

receive, by using the network interface, a third message integrity code sent by the access point when the access point determines that the authentication on the user equipment succeeds, where the third message integrity code is generated by the access point according to the pairwise transient key acquired by the base station;

determine, according to the third message integrity code and a fourth message integrity code, whether authentication on the access point succeeds, where the fourth message integrity code is generated according to the pairwise transient key in the offloading indication; and when determining that the authentication on the access point succeeds, complete the bidirectional authentication with the access point.

Optionally, in a case in which the security parameter includes a pairwise master key, the processor is specifically configured to:

send, by using the network interface, a first message integrity code generated by using a first pairwise transient key to the access point, so that the access point determines, according to the first message integrity code and a second message integrity code, whether authentication on the user equipment succeeds, where the first pairwise transient key is acquired by using the pairwise master key in the offloading indication, the second message integrity code is generated by the access point according to a second pairwise transient key, and the second pairwise transient key is generated by the access point according to the pairwise master key acquired by the base station;

receive, by using the network interface, a third message integrity code sent by the access point when the access point determines that the authentication on the user equipment succeeds, where the third message integrity code is generated by the access point according to the second pairwise transient key;

determine, according to the third message integrity code and a fourth message integrity code, whether authentication on the access point succeeds, where the fourth message integrity code is generated according to the first pairwise transient key; and when determining that the authentication on the access point succeeds, complete the bidirectional authentication with the access point.

Optionally, the processor is further configured to:

send a re-association request to the access point by using the network interface, so that the access point generates the second message integrity code according to the re-association request and the security parameter acquired from the base station;

generate the first message integrity code according to the security parameter in the offloading indication and the re-association request;

receive, by using the network interface, a re-association response sent by the access point; and generate the fourth message integrity code according to the re-association response and the security parameter in the offloading indication.

Optionally, the processor is further configured to:

send an authentication request to the access point by using the network interface, where the authentication request includes a supplicant nonce;

receive, by using the network interface, an authentication response sent by the access point, where the authentication response includes an authenticator nonce; and acquire the first pairwise transient key according to the pairwise master key in the offloading indication, the authenticator nonce, and the supplicant nonce.

Optionally, the security parameter is determined after the base station negotiates with the access point, or is determined by the base station itself.

It can be learned from the foregoing technical solution provided in this embodiment of the present invention that in this embodiment of the present invention, an AP is accessed according to an access method indicated by a base station in an offloading indication and a security parameter included in the offloading indication, so that rapid offloading to a WLAN can be performed, an access delay is reduced, and user experience can be improved.

Figure 10:
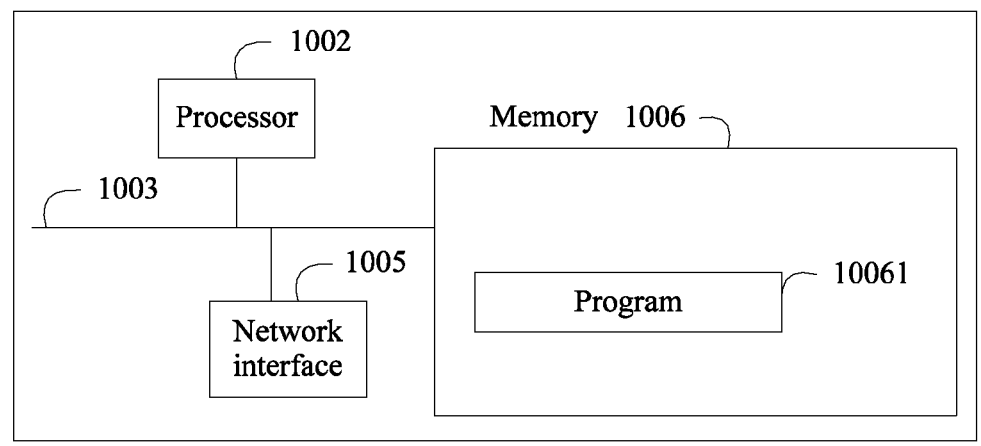
FIG. 10 is a schematic structural diagram of a base station according to another embodiment of the present invention.

FIG. 10 shows a structure of a base station according to another embodiment of the present invention. The base station includes at least one processor 1002 (for example, a CPU), at least one network interface 1005 or another communications interface, a memory 1006, and at least one communications bus 1003 that is configured to implement connection and communication between these apparatuses. The processor 1002 is configured to execute an executable module, such as a computer program, stored in the memory 1006. The memory 1006 may include a high-speed random access memory (RAM: Random Access Memory), and may further include a non-volatile memory (non-volatile memory), such as at least one magnetic disk memory. Communication and connection between the base station and at least one other network element is implemented by using the at least one network interface 1005 (which may be wired or wireless).

In some implementation manners, the memory 1006 stores a program 10061, and the processor 1002 executes the program 10061 to execute the following operations:

acquiring a security parameter used by user equipment and an access point to perform bidirectional authentication, where the base station belongs to a wireless cellular network, and the access point belongs to a wireless local area network; and sending the security parameter to the access point by using the network interface, where the security parameter is used by the access point and the user equipment to perform the bidirectional authentication; and sending an offloading indication to the user equipment, where the offloading indication is used to indicate an access method for the user equipment to access the access point, and the offloading indication includes the security parameter, so that the user equipment performs the bidirectional authentication with the access point according to the received security parameter, and the user equipment accesses the access point according to the access method and performs offloading to the wireless local area network.

Optionally, the security parameter includes a pairwise transient key, where the pairwise transient key is used by the user equipment and the access point to perform the bidirectional authentication.

Optionally, the security parameter includes a pairwise master key, where the pairwise master key is used by the user equipment and the access point to determine a pairwise transient key, and the pairwise transient key is used by the user equipment and the access point to perform the bidirectional authentication.

Optionally, the processor is further configured to: determine, after negotiating with the access point, the security parameter used by the user equipment and the access point to perform the bidirectional authentication; or determine, by itself, the security parameter used by the user equipment and the access point to perform the bidirectional authentication.

It can be learned from the foregoing technical solution provided in this embodiment of the present invention that in this embodiment of the present invention, an offloading indication that indicates an access method for UE to access an AP and includes a security parameter is sent to the UE, so that the UE accesses the AP according to the security parameter. Therefore, the UE can perform rapid offloading to a WLAN, an access delay can be reduced, and user experience can be improved.

Figure 11:
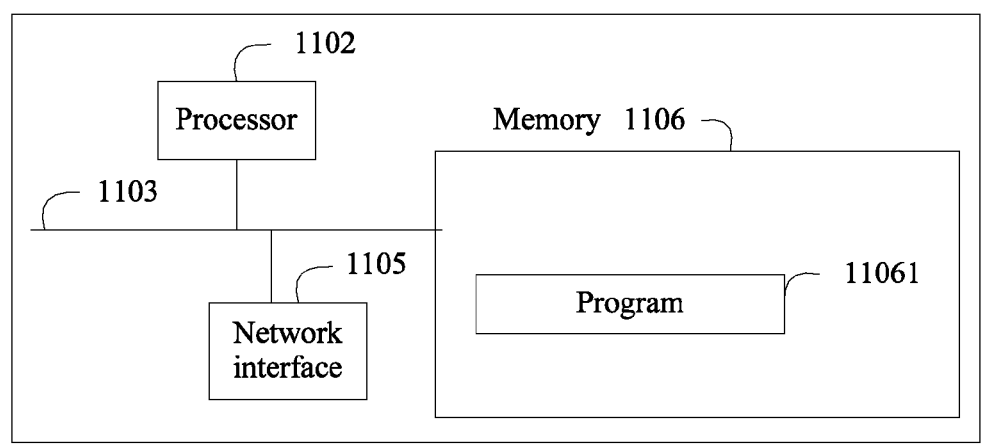
FIG. 11 is a schematic structural diagram of an access point according to another embodiment of the present invention.

FIG. 11 shows a structure of an AP according to another embodiment of the present invention. The AP includes at least one processor 1102 (for example, a CPU), at least one network interface 1105 or another communications interface, a memory 1106, and at least one communications bus 1103 that is configured to implement connection and communication between these apparatuses. The processor 1102 is configured to execute an executable module, such as a computer program, stored in the memory 1106. The memory 1106 may include a high-speed random access memory (RAM: Random Access Memory), and may further include a non-volatile memory (non-volatile memory), such as at least one magnetic disk memory. Communication and connection between the AP and at least one other network element is implemented by using the at least one network interface 1105 (which may be wired or wireless).

In some implementation manners, the memory 1106 stores a program 11061, and the processor 1102 executes the program 11061 to execute the following operations:

receiving, by using the network interface, a security parameter sent by a base station, where the security parameter is used by the access point and user equipment to perform bidirectional authentication, the base station belongs to a wireless cellular network, the access point belongs to a wireless local area network, the security parameter is further carried in an offloading indication sent by the base station to the user equipment, and the offloading indication is used to indicate an access method for the user equipment to access the access point; and performing, the bidirectional authentication with the user equipment according to the security parameter sent by the base station to the access point, so that the user equipment accesses the access point according to the access method and performs offloading to the wireless local area network.

Optionally, in a case in which the security parameter includes a pairwise transient key, the processor is specifically configured to:

receive, by using the network interface, a first message integrity code that is sent by the user equipment and is generated by using the pairwise transient key in the offloading indication;

determine, according to the first message integrity code and a second message integrity code, whether authentication on the user equipment succeeds, where the second message integrity code is generated according to the acquired pairwise transient key; and when determining that the authentication on the user equipment succeeds, send, by using the network interface, a third message integrity code generated by using the acquired pairwise transient key to the user equipment, so that the user equipment determines, according to the third message integrity code and a fourth message integrity code, whether authentication on the access point succeeds, where the fourth message integrity code is generated by the user equipment according to the pairwise transient key in the offloading indication; and when the user equipment determines that the authentication on the access point succeeds, complete the bidirectional authentication with the user equipment.

Optionally, in a case in which the security parameter includes a pairwise master key, the processor is specifically configured to:

receive, by using the network interface, a first message integrity code that is sent by the user equipment and is generated by using a first pairwise transient key, where the first pairwise transient key is generated by the user equipment according to the pairwise master key in the offloading indication;

determine, according to the first message integrity code and a second message integrity code, whether authentication on the user equipment succeeds, where the second message integrity code is generated according to the second pairwise transient key, and the second pairwise transient key is acquired by using the pairwise master key sent by the base station; and when determining that the authentication on the user equipment succeeds, send, by using the network interface, a third message integrity code generated by using the second pairwise transient key to the user equipment, so that the user equipment determines, according to the third message integrity code and a fourth message integrity code, whether authentication on the access point succeeds, where the fourth message integrity code is generated by the user equipment according to the first pairwise transient key; and when the user equipment determines that the authentication on the access point succeeds, complete the bidirectional authentication with the user equipment.

Optionally, the processor is further configured to:

receive, by using the network interface, a re-association request sent by the user equipment, where the re-association request includes the first message integrity code generated by the user equipment by using the security parameter in the offloading indication and the re-association request;

generate the second message integrity code according to the re-association request and the security parameter sent by the base station; and send a re-association response to the user equipment by using the network interface, where the re-association response includes the third message integrity code generated according to the acquired security parameter and the re-association response, so that the user equipment generates the fourth message integrity code according to the re-association response and the security parameter in the offloading indication.

Optionally, the processor is further configured to:

receive, by using the network interface, an authentication request sent by the user equipment, where the authentication request includes a supplicant nonce;

send an authentication response to the user equipment by using the network interface, where the authentication response includes an authenticator nonce; and acquire the second pairwise transient key according to the pairwise master key sent by the base station, the authenticator nonce, and the supplicant nonce.

Optionally, the security parameter is determined after the base station negotiates with the access point, or is determined by the base station itself.

It can be learned from the foregoing technical solution provided in this embodiment of the present invention that in this embodiment of the present invention, bidirectional authentication is performed with UE according to a security parameter that is sent by a base station and is used by an AP and the UE to perform the bidirectional authentication, so that the UE can perform rapid offloading to a WLAN, an access delay can be reduced, and user experience can be improved.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that in the embodiments of the present invention, the terms the "first" and the "second" are intended to merely distinguish different content, and do not impose another limitation on the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An offloading method comprising:
    receiving, by user equipment, an offloading indication sent by a base station, wherein the offloading indication is used to indicate an access method for the user equipment to access an access point, the offloading indication comprises a security parameter used by the user equipment and the access point to perform bidirectional authentication, the access point belongs to a wireless local area network, the base station belongs to a wireless cellular network, and the security parameter comprises a pairwise master key that is further sent by the base station to the access point; and
    performing, by the user equipment, the bidirectional authentication with the access point according to the security parameter sent by the base station to the user equipment, so that the user equipment accesses the access point according to the access method and performs offloading to the wireless local area network, wherein the bidirectional authentication includes the following:
        a) acquiring a first pairwise transient key according to the pairwise master key in the offloading indication;
        b) sending a first message integrity code generated by using the first pairwise transient key to the access point, so that the access point determines, according to the first message integrity code and a second message integrity code, whether authentication on the user equipment succeeds, wherein the second message integrity code is generated by the access point according to a second pairwise transient key, and the second pairwise transient key is generated by the access point according to the pairwise master key acquired by the base station;
        c) receiving, by the user equipment, a third message integrity code sent by the access point when the access point determines that the authentication on the user equipment succeeds, wherein the third message integrity code is generated by the access point according to the second pairwise transient key;
        d) determining, according to the third message integrity code and a fourth message integrity code, whether authentication on the access point succeeds, wherein the fourth message integrity code is generated by the user equipment according to the first pairwise transient key; and
        e) completing the bidirectional authentication with the access point when the user equipment determines that the authentication on the access point succeeds.

2. The method according to claim 1, wherein the method further comprises:
    sending, by the user equipment, an authentication request to the access point, wherein the authentication request comprises a supplicant nonce;
    receiving, by the user equipment, an authentication response sent by the access point, wherein the authentication response comprises an authenticator nonce; and
    acquiring the first pairwise transient key according to the pairwise master key in the offloading indication and also according to a authenticator nonce, and a supplicant nonce.

3. The method according to claim 2, wherein the security parameter is determined after the base station negotiates with the access point, or is determined by the base station.

4. User equipment comprising a processor, a memory, and a network interface, wherein
    the memory is configured to store a program; and
    the processor executes the program to execute the following operations:
        receiving, by using the network interface, an offloading indication sent by a base station, wherein the offloading indication is used to indicate an access method for the user equipment to access an access point, the offloading indication comprises a security parameter used by the user equipment and the access point to perform bidirectional authentication, the access point belongs to a wireless local area network, the base station belongs to a wireless cellular network, and the security parameter comprises a pairwise master key that is further sent by the base station to the access point; and
        performing the bidirectional authentication with the access point according to the security parameter sent by the base station to the user equipment, so that the user equipment accesses the access point according to the access method and performs offloading to the wireless local area network, wherein the bidirectional authentication includes the following:
            a) sending, by using the network interface, a first message integrity code generated by using a first pairwise transient key to the access point, so that the access point determines, according to the first message integrity code and a second message integrity code, whether authentication on the user equipment succeeds, wherein the first pairwise transient key is acquired by using the pairwise master key in the offloading indication, the second message integrity code is generated by the access point according to a second pairwise transient key, and the second pairwise transient key is generated by the access point according to the pairwise master key acquired by the base station;

b) receiving, by using the network interface, a third message integrity code sent by the access point when the access point determines that the authentication on the user equipment succeeds, wherein the third message integrity code is generated by the access point according to the second pairwise transient key;

c) determining, according to the third message integrity code and a fourth message integrity code, whether authentication on the access point succeeds, wherein the fourth message integrity code is generated by using the first pairwise transient key; and d) completing the bidirectional authentication with the access point when determining that the authentication on the access point succeeds.

5. The user equipment according to claim 4, wherein the processor is further configured to:

send an authentication request to the access point by using the network interface, wherein the authentication request comprises a supplicant nonce;

receive, by using the network interface, an authentication response sent by the access point, wherein the authentication response comprises an authenticator nonce; and acquire the first pairwise transient key according to the pairwise master key in the offloading indication, the authenticator nonce, and the supplicant nonce.

6. The user equipment according to claim 5, wherein the security parameter is determined after the base station negotiates with the access point, or is determined by the base station itself.

7. A non-transitory computer readable storage medium having data stored therein representing software executable by a computer, the software including instructions to allow user equipment to rapidly offload data to a wireless local area network, and reduce an access delay, the storage medium comprising:

instructions for receiving an offloading indication sent by a base station, wherein the offloading indication indicates an access method for the user equipment to access an access point, the offloading indication comprises a security parameter used by the user equipment and the access point to perform bidirectional authentication, the access point belongs to a wireless local area network, the base station belongs to a wireless cellular network, and the security parameter comprises a pairwise master key that is further sent by the base station to the access point; and instructions for performing the bidirectional authentication with the access point according to the security parameter sent by the base station to the user equipment, so that the user equipment accesses the access point according to the access method and performs offloading to the wireless local area network, wherein the bidirectional authentication includes the following:

a) sending a first message integrity code generated by using a first pairwise transient key to the access point, so that the access point determines, according to the first message integrity code and a second message integrity code, whether authentication on the user equipment succeeds, wherein the first pairwise transient key is acquired by using the pairwise master key in the offloading indication, the second message integrity code is generated by the access point according to a second pairwise transient key, and the second pairwise transient key is generated by the access point according to the pairwise master key acquired by the base station;

b) receiving a third message integrity code sent by the access point when the access point determines that the authentication on the user equipment succeeds, wherein the third message integrity code is generated by the access point according to the second pairwise transient key;

c) determining, according to the third message integrity code and a fourth message integrity code, whether authentication on the access point succeeds, wherein the fourth message integrity code is generated by using the first pairwise transient key; and d) completing the bidirectional authentication with the access point when determining that the authentication on the access point succeeds.

8. The non-transitory computer readable storage medium according to claim 7, further comprising:

instructions for sending an authentication request to the access point by using the network interface, wherein the authentication request comprises a supplicant nonce;

instructions for receiving, by using the network interface, an authentication response sent by the access point, wherein the authentication response comprises an authenticator nonce; and instructions for acquiring the first pairwise transient key according to the pairwise master key in the offloading indication, the authenticator nonce, and the supplicant nonce.

9. The non-transitory computer readable storage medium according to claim 8, wherein the security parameter is determined after the base station negotiates with the access point, or is determined by the base station itself.

* * * * *